(12) United States Patent
Chew et al.

(10) Patent No.: US 8,209,551 B2
(45) Date of Patent: Jun. 26, 2012

(54) SECURITY FOR RAID SYSTEMS

(75) Inventors: Yen Hsiang Chew, Penang (MY); Subhankar Panda, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1008 days.

(21) Appl. No.: 12/032,554

(22) Filed: Feb. 15, 2008

(65) Prior Publication Data

US 2010/0031060 A1 Feb. 4, 2010

(51) Int. Cl.
G06F 12/14 (2006.01)
(52) U.S. Cl. .................................... 713/193; 714/770
(58) Field of Classification Search .............. 713/193; 714/6.22, 6.23, 6.24, 770
See application file for complete search history.

(56) References Cited

U.S. PATENT DOCUMENTS

| 5,634,033 | A * | 5/1997 | Stewart et al. | 711/114 |
| 7,743,191 | B1 * | 6/2010 | Liao | 710/240 |
| 2005/0081048 | A1 * | 4/2005 | Komarla et al. | 713/193 |
| 2009/0089502 | A1 * | 4/2009 | Cheng et al. | 711/114 |

OTHER PUBLICATIONS

Patterson, "A Case for Redundant Arrays of Inexpensive Disks (RAID)," Proceedings of the ACM SIGMOD International Conference on Management of Data, 1988, pp. 109-116.
NIST, Advanced Encryption Standard (AES), Federal Information Processing Standards Publication 197, Nov. 26, 2001, available at http://csrc.nist.gov/publications/fips/fips197/fips-197.pdf, retrieved on Feb. 14, 2012.

* cited by examiner

*Primary Examiner* — Ashok Patel
*Assistant Examiner* — Tracy Mangialaschi
(74) *Attorney, Agent, or Firm* — Grossman, Tucker, Perreault & Pfleger, PLLC

(57) ABSTRACT

Methods and apparatus for accessing a redundant array of independent drives (RAID) storage device are disclosed. In some embodiments file data is broken into multiple segments. A cryptographic operation is performed on one or more segments to generate encrypted segment(s). One or more parity syndrome is computed from the encrypted segment(s) and the unencrypted segment(s). The encrypted segment(s), the unencrypted segment(s) and the parity syndrome(s) are striped onto different individual drives. Since the cryptographic operation is not performed on all the segments, it may also be performed concurrently with computing of parity syndrome(s) from other unencrypted segments.

14 Claims, 3 Drawing Sheets

US 8,209,551 B2

SECURITY FOR RAID SYSTEMS

FIELD OF THE DISCLOSURE

This disclosure relates generally to the field of computer systems. In particular, the disclosure relates to security measures integrated into Redundant Arrays of Independent Drives (RAID) systems.

BACKGROUND OF THE DISCLOSURE

RAID systems (which are also defined as "Redundant Arrays of Independent Disks" or sometimes according to the original definition, "Redundant Arrays of Inexpensive Drives") are computer storage systems that divide and/or replicate data storage among multiple storage devices. This term for using two or more drives to appear as a single device to a host system came from a published paper: "*A Case for Redundant Arrays of Inexpensive Disks (RAID)*" by David Patterson et al, at SIGMOD (ACM's Special Interest Group on Management of Data) in June 1988.

Commonly recognized categories of RAID systems are divided into seven levels. RAID 0 refers to a system where the data is broken into fragments or striped to multiple drives without parity. RAID 0 provides improved performance and additional storage but no fault tolerance. RAID 1 refers to a system where the data is mirrored on multiple drives without parity. Thus RAID 1 provides fault tolerance from drive errors and single drive failures. RAID 2, which involves Hamming codes for error correction, and is not that commonly used. RAID 3 refers to a system where the data is striped on multiple drives with a dedicated parity drive. Thus RAID 3 provides improved performance and fault tolerance but the single parity disk is a bottle-neck for writing since all writes require updating the parity data. RAID 4 refers to a system that is just like RAID 3 but uses block-level striping instead of byte-level striping. RAID 5 refers to a system where the data is striped on multiple drives using distributed or rotated parity stripes. RAID 5 provides improved performance without the bottle-neck for writing and the distributed parity can survive and/or recover from a single drive failure. RAID 6 refers to a system where the data is striped on multiple drives using two distributed or rotated parity stripes. Thus in RAID 6 the dual distributed parity can survive and/or recover from two drive failures and there is time to rebuild the array without data being volatile while a failed drive is being recovered.

Data security/privacy can be achieved through encryption of the data. Encryption is useful in that it prevents someone with physical access to the drive(s) from getting the data unless they have the passphrase/key. It also enables the data on the drive(s) to be wiped with greater confidence when transferring or discarding the drive(s).

One popular encryption technique is known as the Advanced Encryption Standard (AES). AES was announced in Nov. 26, 2001 by the National Institute of Standards and Technology (NIST) as U.S. FIPS PUB 197 (FIPS 197). AES has a fixed block size of 128 bits and a key sizes of 128, 192 or 256 bits. Key expansion using Rijndael's key schedule transforms the keys of size 128, 192 or 256 bits into 10, 12 or 14 round keys of 128 bits. On systems with 32-bit or larger words, it is possible to implement the AES cipher by converting the SubBytes, ShiftRows and MixColumns transformations of the AES encryption/decryption algorithm into four 256-entry 32-bit tables, which utilize 4096 bytes of memory. One drawback to a software implementation of AES is lowered performance.

In a high performance storage system a cryptographic engine may be deployed in hardware to encrypt/decrypt the data. In an encrypted RAID storage system, computation of a parity syndrome should also be performed in order to recover the encrypted data in the event of a drive failure. One drawback is that such computations of parity syndromes between data segments may require waiting until the segments have been encrypted, increasing delays and lowering performance. Another drawback is that multiple cryptographic engines may be required to avoid waiting for the first two segments to be encrypted serially before computing a parity syndrome. This may increase the cost of such encrypted RAID storage systems. Therefore, design tradeoffs involving desirable features such as data security/privacy and high performance versus undesirable features such as increased costs in RAID storage systems have not, to date, been fully explored.

BRIEF DESCRIPTION OF THE DRAWINGS

The present invention is illustrated by way of example and not limitation in the figures of the accompanying drawings.

DETAILED DESCRIPTION

Methods and apparatus for accessing a redundant array of independent drives (RAID) storage device are disclosed. In some embodiments file data is broken into multiple segments. A cryptographic operation is performed on one or more segments to generate encrypted segment(s). One or more parity syndrome is computed from the encrypted segment(s) and the unencrypted segment(s). The encrypted segment(s), the unencrypted segment(s) and the parity syndrome(s) are striped onto different individual drives. Since the cryptographic operation is not performed on all the segments, it may also be performed concurrently with computing of parity syndrome(s) from other unencrypted segments.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Figure 1:
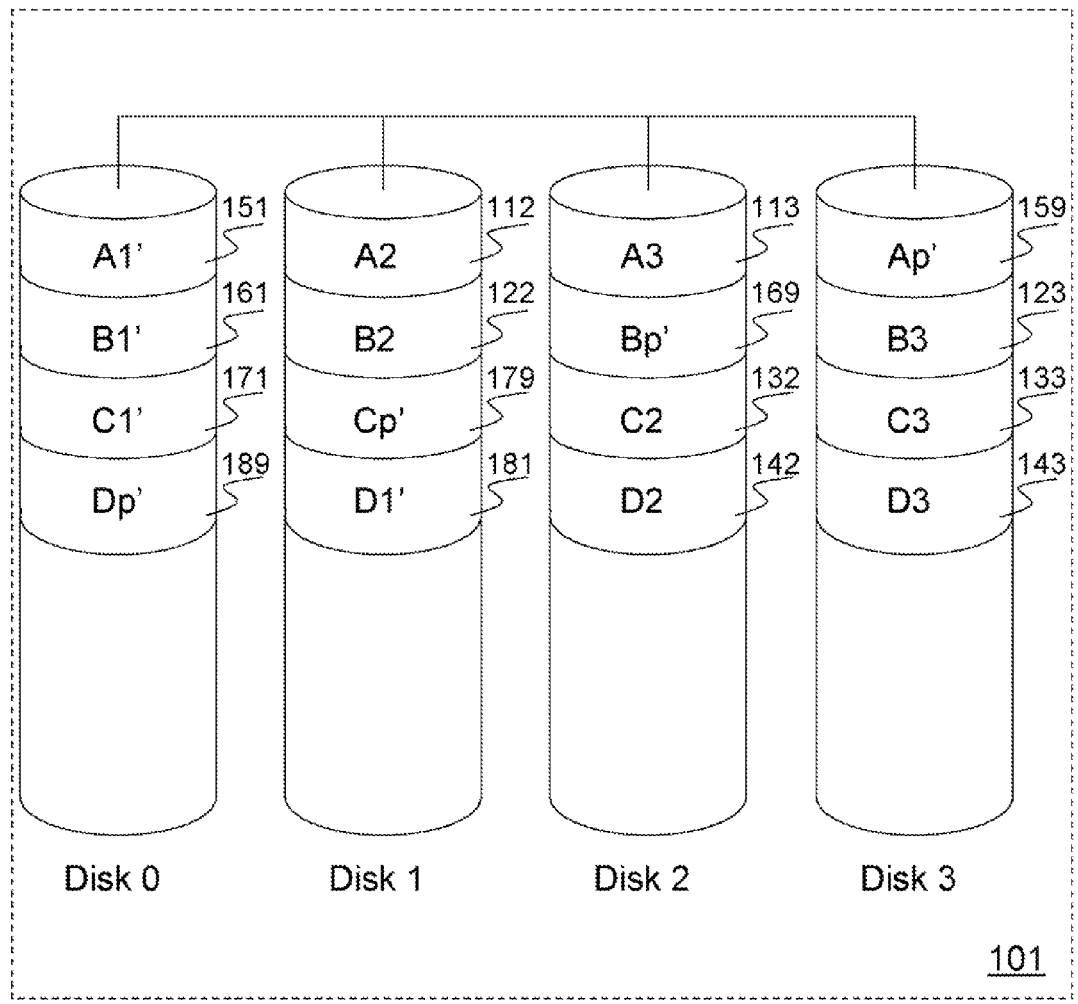
FIG. 1 illustrates one embodiment of a storage scheme in a redundant array of independent drives (RAID) storage device that employs partial encryption of data.

FIG. 1 illustrates one embodiment of a storage scheme in a redundant array of independent drives (RAID) storage device 101 that employs partial encryption of data. RAID storage device 101 has multiple distinct drives, disks 0-3. RAID descriptor processing segments the file data into multiple unencrypted segments A1-A3, B1-B3, C1-C3 and D1-D3 and transfers these multiple unencrypted segments for further processing. Cryptographic processing encrypts the unencrypted data segments A1, B1, C1 and D1 to generate encrypted data A1' of segment 151, B1' of segment 161, C1' of segment 171 and D1' of segment 181, respectively. Concurrently with cryptographic processing, parity syndromes may be computed between unencrypted segments 112 and 113, 122 and 123, 132 and 133 and 142 and 143, respectively, in order to avoid performance penalties for encrypting segments 151, 161, 171 and 181. Then parity syndromes may be computed between the encrypted data segments 151, 161, 171 and 181 and the previous parity syndrome of segments 112 and 113, 122 and 123, 132 and 133 and 142 and 143, respectively, e.g. as a bitwise exclusive-OR (XOR) between encrypted segment data and previous parity syndromes as in RAID 5.

The RAID descriptor processing stripes encrypted segments 151, 161, 171 and 181 and unencrypted segments 112-113, 122-123, 132-133 and 142-143, along with parity syndromes 159, 169, 179 and 189 onto the multiple distinct drives respectively. In some embodiments RAID 5 descriptor processing may be used as shown in the exemplary RAID storage device 101 illustrated in FIG. 1, but the invention is not so limited. In some embodiments of storage device 101, three or more drives may be used, while in other embodiments four or more drives may be used but the invention is not so limited.

In one embodiment of storage device 101 the partial encryption of data refers to encrypted segments 151, 161, 171 and 181 being the only segments that are encrypted but the invention is not so limited. It will be appreciated that in embodiments of RAID storage device 101, encryption of a single segment or a small number of segments may provide sufficient security to the files stored on RAID storage device 101 while reducing cost and improving performance.

In one embodiment of storage device 101 the partial encryption of data uses AES to encrypt segments 151, 161, 171 and 181 but the invention is not so limited. As mentioned above AES has a fixed block size of 128 bits and a key size of 128, 192 or 256 bits. Key expansion transforms the keys of size 128, 192 or 256 bits into 10, 12 or 14 round keys of 128 bits. The round keys are used to process the data in rounds as 128-bit blocks (viewed as 4-by-4 arrays of bytes) and convert them to ciphertext blocks.

Typically, for a 128-bit input to the round (16 bytes) each byte is replaced by another byte according to a lookup table called the S-box. This portion of the block cipher is called SubBytes. Next the rows of bytes (viewed as a 4-by-4 array) are cyclically shifted or rotated left by a particular offset (i.e. row zero by 0 bytes, row one by 1 byte, row two by 2 bytes and row three by 3 bytes). This portion of the block cipher is called ShiftRows. Then each of the columns of bytes are viewed as four coefficients of a polynomial in a finite field, GF(256) (also called Galois field $2^8$), and multiplied by an invertible linear transformation. This portion of the block cipher is called MixColumns. Finally, the 128-bit block is XORed with a round key to produce a ciphertext block of 16 bytes, which is called AddRoundKey.

Thus encrypted segments 151, 161, 171 and 181 may be provided with security/privacy and encrypted segments 151, 161, 171 and 181 may be recovered in RAID storage device 101 from parity syndromes 159, 169, 179 and 189 but (without the cryptographic keys) not the unencrypted data.

Figure 2:
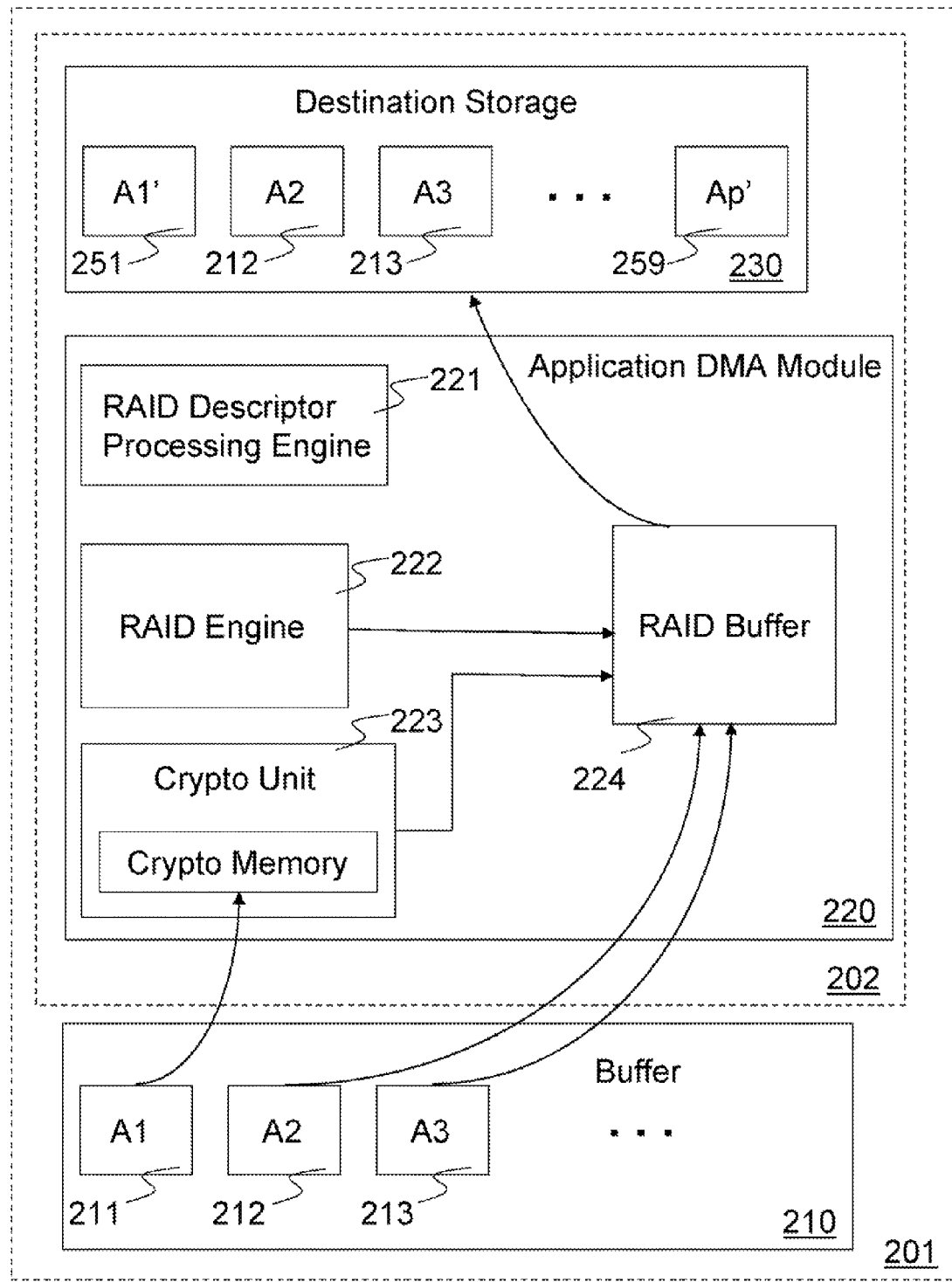
FIG. 2 illustrates one embodiment of an apparatus for accessing a RAID storage device employing partial encryption of data.

FIG. 2 illustrates one embodiment of an apparatus 201 for accessing a RAID storage device 202 employing partial encryption of data. RAID storage device 202 includes destination storage 230 and application direct memory access (ADMA) module 220. A RAID descriptor processing engine 221 of ADMA module 220 is operable to process RAID software descriptors having command fields to depict RAID operations and addresses of sources in file data buffer 210 and destination storage 230 to segment a file data buffer into multiple unencrypted segments 211, 212, 213, . . . and to direct memory access (DMA) transfer these multiple unencrypted segments from the file data buffer 210 for processing in ADMA module 220.

Cryptographic unit 223 is operable to receive a DMA transfer of an unencrypted segment 211 by the RAID descriptor processing engine 221 of ADMA module 220 and to perform a cryptographic operation on the unencrypted data A1 of segment 211 to generate an encrypted data A1' segment 251. RAID buffer 224 is operable to receive a DMA transfer of the unencrypted data A2 of segment 212 and another DMA transfer of the unencrypted data A3 of segment 213 by the RAID descriptor processing engine 221 and RAID processing engine 222 is operable to compute a parity syndrome for the unencrypted segment 212 and the unencrypted segment 213. It will be appreciated that the computing of a parity syndrome for segments 212 and 213 and the performing of a cryptographic operation on segment 211 may be performed concurrently in order to avoid a performance penalty for encrypting segment 211. It will also be appreciated that some alternative embodiments of RAID processing engine 222 may be capable of computing multiple parity syndromes concurrently.

Then RAID buffer 224 receives the encrypted data A1' of segment 251 from Crypto unit 223 and RAID processing engine 222 computes a parity syndrome for the encrypted data A1' of segment 251 and the previous parity syndrome of segments 212 and 213. it will be appreciated that the parity syndromes may be computed for some embodiments as a bitwise exclusive-OR (XOR) between segment data and/or previous parity syndromes, e.g. as in RAID 5. It will also be appreciated that some parity syndromes may be computed for some alternative embodiments as a Reed-Solomon code between segment data and/or previous parity syndromes, e.g. as in RAID 6.

Destination storage 230 has multiple distinct drives (e.g. disks 0-3 as illustrated in FIG. 1). The RAID descriptor processing engine 221 is operable to stripe the encrypted segment 251 and the unencrypted segments 212-213 onto the multiple distinct drives respectively.

Figure 3:
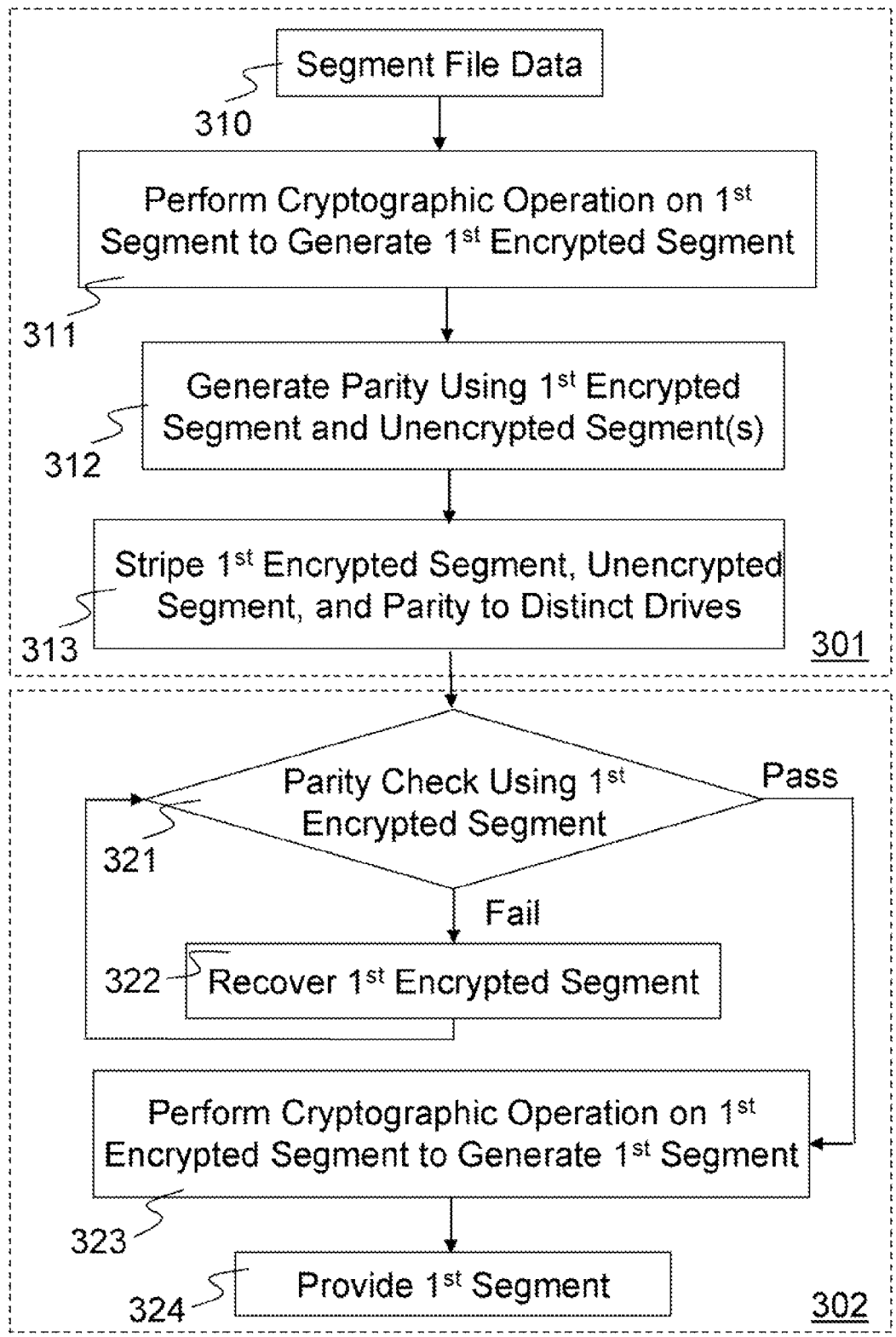
FIG. 3 illustrates a flow diagram for one embodiment of a process to access a RAID storage device employing partial encryption of data.

FIG. 3 illustrates a flow diagram for embodiments of processes 301 and 302 to access a RAID storage device employing partial encryption of data. Processes 301 and 302 and other processes herein disclosed are performed by processing blocks that may comprise dedicated hardware or software or firmware operation codes executable by general purpose machines or by special purpose machines or by a combination of both.

In processing block 310 a file data is segmented into multiple unencrypted segments. In processing block 311 a cryptographic operation is performed on a first unencrypted segment to generate a first encrypted segment. ft will be appreciated that the first unencrypted segment and first encrypted segment need not correspond to the first sequential segment of file data, but could be any segment. In processing block 312 a first parity syndrome is computed for the first encrypted segment and the unencrypted segment(s). In processing block 313 the first encrypted segment, the unencrypted segment(s) and the first parity syndrome are striped respectively onto distinct drives.

It will be appreciated that in case of a drive failure, the first encrypted segment or any other single unencrypted segment(s) could be recovered from the first parity syndrome, but that the first unencrypted segment could not be recovered without cryptographic keys, thereby employing partial encryption of data to increase security for the file data.

It will also be appreciated that a second parity syndrome for unencrypted segments may be computed concurrently with the cryptographic operation performed in processing block 311, thereby hiding additional latency associated with the cryptographic operation. Then in processing block 312 the first parity syndrome could be computed for the first encrypted segment and the unencrypted segment(s) by computing a parity syndrome between the first encrypted segment and the second parity syndrome. It will be appreciated that generating parity in processing block 312 may include computing multiple parity syndromes for the first encrypted segment and unencrypted segments, one of the parity syndromes being a Reed-Solomon code (e.g. as in RAID 6).

Process 301 performs a write access to a RAID storage device employing partial encryption of data. Process 302 performs a read access to the RAID storage device employing partial encryption of data.

In processing block 321 a parity check is performed using the first encrypted segment and upon passing the parity check in processing block 321 the first encrypted segment may be provided to processing block 323 where another cryptographic operation is performed on the first encrypted segment to decrypt and regenerate the first unencrypted segment, which may be provided in processing block 324 to satisfy the read access request. Otherwise, upon failing the parity check in processing block 321 the first encrypted segment can be recovered from the first parity syndrome in processing block 322 and processing subsequently repeated in processing block 321. It will also be appreciated that the parity check in processing block 321 may include multiple parity syndromes, one of the parity syndrome being a Reed-Solomon code (e.g. as in RAID 6).

Thus encrypted segments may be provided with security/privacy and may be recovered from RAID storage using parity syndromes but the unencrypted data can not be recovered without cryptographic keys. By employing partial encryption of data, parity syndromes for unencrypted segments may be computed concurrently with the cryptographic operations, thereby hiding additional latency associated with the cryptographic operation and increasing performance. By computing parity syndromes between encrypted segments and unencrypted segments, duplication of cryptographic hardware is also avoided, reducing implementation costs.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A machine implemented method comprising:
  accessing a redundant array of independent drives (RAID) storage device, comprising a first drive and a second drive;
  segmenting a file data buffer into a plurality of segments including at least a first unencrypted segment, a second unencrypted segment, and a third unencrypted segment;
  performing a cryptographic operation on the first unencrypted segment to generate a first encrypted segment;
  computing a second parity syndrome between the second unencrypted segment and at least the third unencrypted segment concurrent with the cryptographic operation on the first unencrypted segment;
  computing a first parity syndrome between the first encrypted segment and the second parity syndrome; and
  striping the first encrypted segment and the second unencrypted segment on said first and said second drive respectively, the first drive being different from the second drive.

2. The method of claim 1, further comprising:
  striping the third unencrypted segment and the first parity syndrome on a third and a fourth drive respectively, the third drive being different from the fourth drive and both being different from the first and the second drives.

3. The method of claim 1, further comprising:
  computing a third parity syndrome between the first encrypted segment and at least the second unencrypted segment, wherein the third parity syndrome is a Reed-Solomon code.

4. The method of claim 3, further comprising:
  striping the first parity syndrome and the third parity syndrome on a third and a fourth drive respectively, the third drive being different from the fourth drive and both being different from the first and the second drives.

5. The method of claim 1 wherein the file data is segmented into a plurality of segments, substantially all segments being 128-bit segments.

6. An article of manufacture to implement the method of claim 5, the article comprising
  a non-transitory machine-accessible medium including data that, when accessed by a machine, cause the machine to implement the method of claim 5.

7. An apparatus comprising:
  a RAID descriptor processing engine to segment a file data buffer into a plurality of segments including at least a first unencrypted segment, a second unencrypted segment, and a third unencrypted segment, and to direct memory access (DMA) transfer the plurality of segments from the file data buffer for processing;
  a cryptographic unit to receive a DMA transfer of the first unencrypted segment by the RAID descriptor processing engine and to perform a cryptographic operation on the first unencrypted segment to generate a first encrypted segment;
  a RAID processing engine to receive at least a DMA transfer of the second unencrypted segment by the RAID descriptor processing engine and to compute a second parity syndrome between the second unencrypted segment and at least the third unencrypted segment concurrent with the cryptographic operation on the first unencrypted segment,
  the RAID processing engine further configured to compute a first parity syndrome between the first encrypted segment and the second parity syndrome; and
  a destination storage having a plurality of drives including a first drive and a second drive different from the first drive, said RAID descriptor processing engine to stripe the first encrypted segment and the second unencrypted segment onto the first and the second drive respectively.

8. The apparatus of claim 7, said RAID descriptor processing engine to stripe the third unencrypted segment and the first parity syndrome on a third and a fourth drive respectively, the third drive being different from the fourth drive and both being different from the first and the second drives.

9. The apparatus of claim 7, said RAID processing engine to compute a third parity syndrome between the first encrypted segment and at least the second unencrypted segment, wherein said third parity syndrome is a Reed-Solomon code.

10. The apparatus of claim 9, said RAID descriptor processing engine to stripe the first parity syndrome and the third parity syndrome on a third and a fourth drive respectively, the third drive being different from the fourth drive and both being different from the first and the second drives.

11. The apparatus of claim 7 wherein the file data is segmented into a plurality of segments, substantially all segments being 128-bit segments.

12. A RAID storage system comprising:

a plurality of distinct drives including a first drive, a second drive, a third drive and a fourth drive;

a RAID descriptor processing logic to segment a file data buffer into a plurality of segments including at least a first unencrypted segment A1, a second unencrypted segment A2 and a third unencrypted segment A3, and to transfer the plurality of segments from the file data buffer for processing;

a cryptographic logic to receive a transfer of the segment A1 by the RAID descriptor processing logic and to perform a cryptographic operation on the unencrypted segment A1 to generate a first encrypted segment A1';

a parity logic to receive transfers of the segment A2 and the segment A3 by the RAID descriptor processing logic, and to compute a second parity syndrome between the segment A2 and at least the segment A3 concurrent with said cryptographic operation on the segment A1, and to compute a first parity syndrome Ap' between the encrypted segment A1' and the second parity syndrome; and said RAID descriptor processing logic to stripe the segment A1', the segment A2, the segment A3 and the first parity syndrome Ap' onto the first drive, the second drive, the third drive and the fourth drive, respectively.

13. The storage system of claim 12, said parity logic to compute a third parity syndrome for the segment A2 and at least the segment A3 concurrent with said cryptographic operation on the segment A1, and to compute a fourth parity syndrome Aq' from the encrypted segment A1' and the third parity syndrome, wherein said fourth parity syndrome Aq' is a Reed-Solomon code.

14. The storage system of claim 13, said RAID descriptor processing logic to stripe the fourth parity syndrome Aq' onto a fifth drive of the plurality of distinct drives.

* * * * *